United States Patent [19]
Gerighausen et al.

[11] 3,735,230
[45] May 22, 1973

[54] MOTOR DRIVEN SURFACE MEASURING APPARATUS

[75] Inventors: Werner Gerighausen, Ronnenberg; Bernhard Heimbrecht, Garbsen; Johannes Perthen, Hanover, all of Germany

[73] Assignee: Johannes Perthen, Hanover, Germany

[22] Filed: Sept. 29, 1971

[21] Appl. No.: 184,681

Related U.S. Application Data

[63] Continuation-in-part of Ser. No. 14,124, Feb. 25, 1970, abandoned.

[30] Foreign Application Priority Data

Feb. 26, 1969 Germany............P 19 09 683.4

[52] U.S. Cl...................................318/637, 318/609
[51] Int. Cl...........................................G05b 11/01
[58] Field of Search................318/637, 685, 609

[56] References Cited

UNITED STATES PATENTS 3,113,302  12/1963  Goodman..........................318/637 X
3,264,541  8/1966  Mell..................................318/685 X Primary Examiner—T. E. Lynch
Attorney—Marshall & Yeasting

[57] ABSTRACT

A sensing element and a surface to be measured are moved relative to one another at a controllable speed and throughout a controllable distance, and at least one electrical driving motor is provided for performing such movement. A source of reference voltage is applied to a regulator for maintaining the speed of rotation of the driving motor proportional to the reference voltage. An integrator is connected to measure the speed of rotation of the driving motor and produces an electrical output proportional to the time integral of such speed, a trigger circuit being connected to the output of the integrator.

3 Claims, 4 Drawing Figures

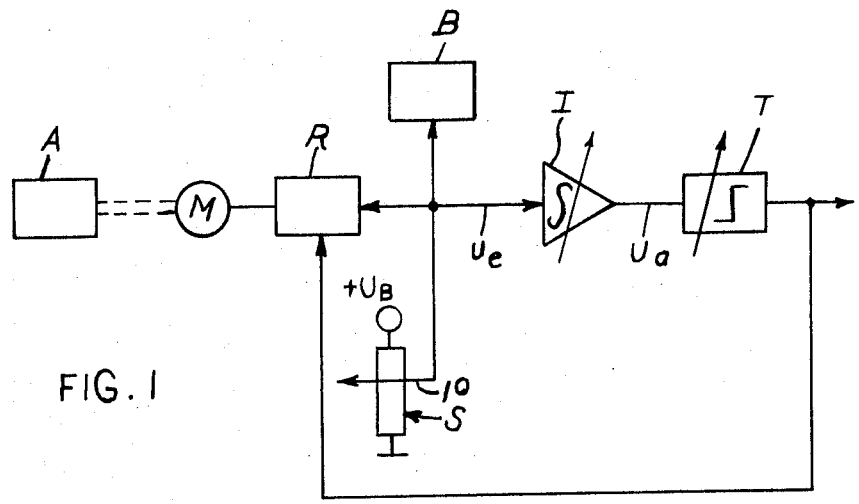
FIG. 1
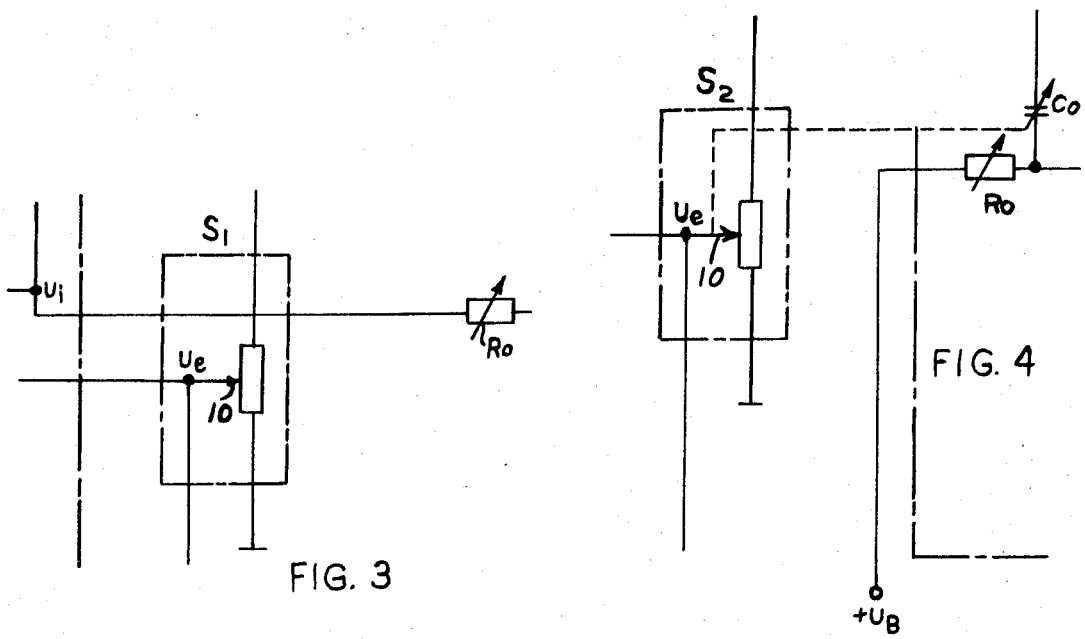
FIG. 3
FIG. 4 ically has for its object, in overcoming these difficulties of the known embodiments, to provide a surface measuring apparatus of the class hereinbefore described which is constructed in such a manner that the travel and the speed of the driven elements can be varied continuously and within wide limits, and a substantial saving in mechanical elements, such as gear transmissions, control contacts etc. is achieved.

MOTOR DRIVEN SURFACE MEASURING APPARATUS

CROSS-REFERENCE TO RELATED APPLICATION

This application is a continuation-in-PART OF application Ser. No. 14,124, filed Feb. 25, 1970 now abandoned.

BACKGROUND OF THE INVENTION

The invention relates to a surface measuring apparatus with at least one electrical driving motor for the sensing element-feeding apparatus, the feed for the work and/or the paper drive in a recording apparatus, and also with an arrangement for varying the velocity and the distance of travel of the driven elements.

In surface measuring apparatus a sensing element usually is moved by means of a driving apparatus over the surface to be sensed. In the known embodiments the driving of the feeding apparatus is carried out with constant velocity by means of a synchronous motor. When the speed of measurement is to be changed, there is a readjustment of a gear transmission which is interposed between the driving motor and the sensing element.

The same is true for a drive of the feed of the work (with a stationary sensing element) and for the paper drive of a recording apparatus which is often provided in a surface measuring apparatus.

The adjustment of the driving speed by means of a gear transmission makes possible only a very limited number of speeds; moreover, even for a rather small number of steps of speed there is a considerable expense and an undesirably great space requirement. A further disadvantage is that when this mechanical drive is used no continuous variation of the velocity is possible. As a direct result of this situation, there is a particular problem in the measurement of curved surfaces, in that it is necessary to maintain a fixed velocity of measurement, for example, regardless of the radius of the rotating part.

Now in many cases in a surface measuring apparatus not only the velocity but also the length of the path of travel of the driven elements (for example the length of the path of the sensing element-driving apparatus) should be adjustable. In the known embodiments, for this purpose limit switch contacts or rotary cam switches are provided in the drive. These embodiments, however, are mechanically very cumbersome and entail a high weight as well as a great space requirement. Here also in general there is provided only a limited number of positions of adjustment, while a continuous variation of intermediate positions cannot as a rule be provided.

SUMMARY OF THE INVENTION

The invention accordingly has for its object, in overcoming these difficulties of the known embodiments, to provide a surface measuring apparatus of the class hereinbefore described which is constructed in such a manner that the travel and the speed of the driven elements can be varied continuously and within wide limits, and a substantial saving in mechanical elements, such as gear transmissions, control contacts etc. is achieved.

In accordance with the invention this object is attained by connecting the output of a source of reference voltage to a regulator which maintains a speed of rotation of the driving motor proportional to the reference voltage, and by providing an integrator which is connected to measure the speed of rotation of the driving motor and which produces an electrical output proportional to the time integral of such speed, a trigger circuit being connected to the output of the integrator.

Since in the surface measuring apparatus according to the invention the speed of rotation of the driving motor is maintained proportional to the reference voltage, a determination of the distance traveled by the driven element can be made by electrical integration of this reference voltage. When a trigger circuit is supplied with the output signal of the integrator, there is obtained in a simple manner an electrical signal when the driven element has traveled through the desired distance.

BRIEF DESCRIPTION OF THE DRAWINGS

FIG. 1 is a circuit diagram of an apparatus embodying the invention.

FIG. 3 is a fragment of the wiring diagram shown in FIG. 2, illustrating a modified embodiment.

FIG. 4 is a fragment of the wiring diagram shown in FIG. 2, illustrating a preferred embodiment of the invention.

DESCRIPTION OF THE PREFERRED EMBODIMENTS

Figure 2:
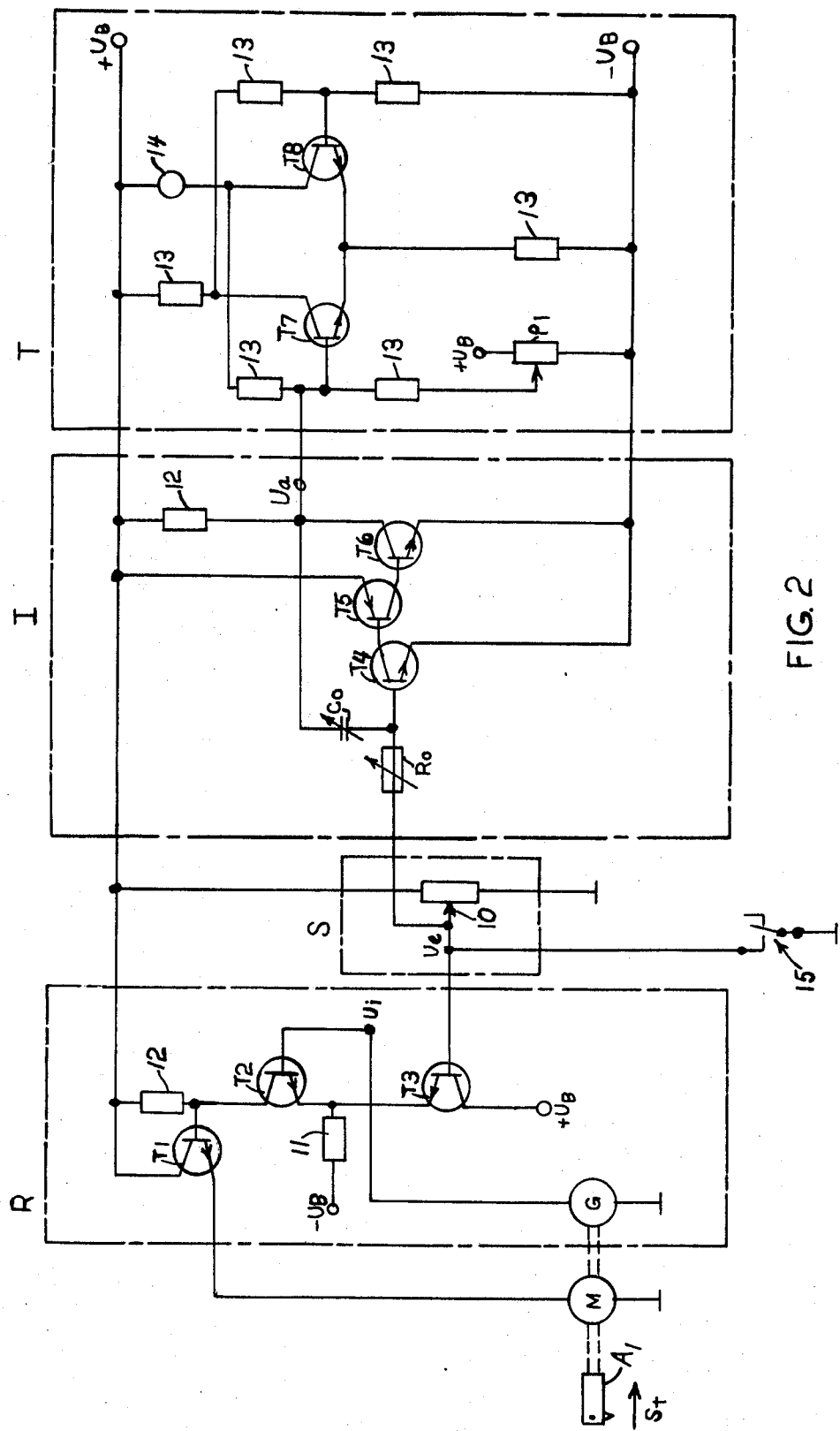
FIG. 2 is a wiring diagram illustrating conventional components which may be used in the circuit of FIG. 1.

The circuit diagram of FIG. 1 comprises a motor M which drives an element A of the surface measuring apparatus. This driven element A may be, for example, a sensing element-feeding apparatus which is described in detail in U.S. Pat. No. 3,580,062. The driven element specifically may constitute a holder for the work, as described in that patent, or the driven element may constitute the sensing element itself, such as the feeler $A_1$ in FIG. 2. The driven element A also may constitute a part of the recording apparatus B which is driven in order to produce a continuous record of the value measured by the surface measuring apparatus.

The circuit comprises also a source of reference voltage S, a regulator R, an electrical integrator I and a trigger circuit T. The source of reference voltage S may be of the conventional type shown in the drawing, consisting of a source of fixed potential $U_B$ connected to ground through a resistor provided with a slider 10. The slider 10 is set to provide an input voltage $U_e$ of the desired magnitude, and is connected on the one hand to the regulator R and on the other hand to the integrator I. Also the source of reference voltage S may be further connected with a recorder B.

The regulator R controls the speed of the motor M by maintaining the speed of rotation of the motor proportional to the reference voltage supplied by the slider 10 of the voltage source S, as hereinbefore described. The regulator R may be of a conventional type, as illustrated in FIG. 2.

The regulator R shown in FIG. 2 comprises a simple differential amplifier including the transistors T2 and T3.

This differential amplifier compares the reference voltage $U_e$ provided by the slider 10 with the output voltage $U_i$ of a tachogenerator G driven by the motor M. The output voltage $U_i$ of the tachogenerator G is proportional to the actual speed of rotation of the motor M.

So long as the output voltage $U_t$ is equal to the reference voltage $U_e$, current between the positive and negative sides of the line flows through both of the transistors T2 and T3 and through the resistor 11. However, if the output voltage $U_t$ drops, the current flow through the transistor T2 is substantially cut off, and the resulting drop in the current flowing through the resistor 12 causes the potential at the base of the transistor T1 to approach the positive line voltage, so as to increase the amount of current flowing through the transistor T1 to the motor M. The motor M may be a direct current motor with a permanent magnet field.

The transistors T2 and T3 thus function as a sensitive differential amplifier to control the current flowing through the resistor 12 and thus to control the potential at the base of transistor T1 and the motor speed in order to maintain the potential $U_t$ equal to the reference voltage $U_e$. The motor M thus drives the feeler $A_1$ across the work at a speed determined by the reference voltage $U_e$.

The integrator I shown in FIG. 2 comprises the variable capacitor $C_o$ and the variable resistor $R_o$. The integrator I is a conventional Miller integrator, including the transistors T4, T5 and T6 and the resistor 12.

While the condenser $C_o$ is being charged, the Miller integrator maintains a substantially constant potential at the junction between the capacitor $C_o$ and the resistor $R_o$. Any tendency of the potential at that junction point to become more positive is resisted by the three transistors, causing the effective resistance of the transistor T6 to decrease so as to increase the current flowing through the fixed resistor 12 and the transistor T6. Thus the voltage drop across the resistor 12 increases as the charge of the capacitor $C_o$ increases. The maintenance of a constant potential at the junction between the capacitor $C_o$ and the resistor $R_o$ causes a constant current to flow through the resistor $R_o$ to charge the capacitor $C_o$, so long as the reference voltage $U_e$ remains constant.

The output voltage $U_a$ of the Miller integrator I is applied to the input of a conventional Schmitt trigger T, comprising the transistors T7 and T8 and the load resistors 13. As soon as the potential $U_a$ reaches the preset threshold value, the transistor T7 is turned off and the transistor T8 is turned on, energizing the relay 14. The threshold value is determined by the setting of the potentiometer $P_1$.

When the relay 14 is energized, the normally open contacts 15 of the relay 14 are closed, short circuiting the source of reference voltage S. This turns off the transistor T3, and the increased current flowing through the transistor T2 increases the voltage drop across the resistor 12 so as to turn off the transistor T1 and stop the motor M.

FIG. 3 shows a modification in which the output voltage $U_t$ of the tachogenerator, instead of the reference voltage $U_e$, is applied to the resistor $R_o$ of the Miller integrator I.

Since the output voltage of the tachogenerator is a more accurate measure of the speed of the motor than the reference voltage, the modification shown in FIG. 3 gives more accurate results than the modification shown in FIG. 2.

FIG. 4 shows a preferred embodiment which differs from the arrangement shown in FIG. 2 in that a constant input voltage is applied to the variable resistor $R_o$ of the Miller integrator I, while the variable capacitor $C_o$ is mechanically coupled to the slider 10 so that the capacity of the capacitor $C_o$ always varies inversely with the reference voltage.

In the embodiment shown in FIG. 4, when the slider 10 is adjusted to a new position to establish a new speed of operation of the driving motor, the length of the relative movement of the sensing element and the surface to be measured remains unchanged. That is true because the connection between the slider 10 and the capacitor $C_o$ causes the capacity of the capacitor as well as the time constant $C_oR_o$ to vary inversely with the reference voltage $U_e$. Accordingly, regardless of the setting of the reference voltage $U_e$, the same distance of relative movement of the sensing element and the work is required in each case to cause the output voltage of the integrator I to reach the threshold value to which the Schmitt trigger has been set.

In the embodiment shown in FIG. 4, the preset distance of relative movement of the sensing element and the work can be changed whenever desired by changing the setting of the variable resistor $R_o$. In the embodiments shown in FIGS. 2 and 3, the preset distance of relative movement of the sensing element and the work can be changed when desired by changing either the setting of the variable resistor $R_o$ or the setting of the variable capacitor $C_o$ in order to change the time constant $R_oC_o$ of the integrator.

In all three of the embodiments shown in FIGS. 2, 3 and 4, the integrator I is connected to measure the speed of rotation of the driving motor and produces an electrical output $U_a$ which is proportional to the time integral of such speed.

The time constant of the integrator I is equal to $C_o \times R_o$, and may be represented by $T_o$. Then for the circuit shown in FIG. 2:

$$U_a = \frac{1}{T_o} \cdot \int_0^t U_e \cdot dt \qquad (1)$$

Since the input voltage $U_e$ of the integrator is identical with the reference voltage, and the regulator R maintains the speed of rotation of the driving motor M proportional to this reference voltage, $U_e$ is therefore proportional to the speed of travel $v_t$ of the element A which is driven by the motor:

$$U_e \sim v_t \qquad (2)$$

Now the distance traveled is known to be the time integral of the speed. The distance $s_t$ which has been traveled in the time interval $t$ by the driven element A, accordingly as follows from the equations (1) and (2) is proportional to the output voltage $U_a$ of the integrator I:

$$U_a \sim (1/T_o) \cdot s_t \qquad (3)$$

When the output voltage $U_a$ of the integrator I attains a predetermined value $U_{amax}$, at which the trigger circuit T is set, then there is delivered by the output of this trigger circuit T a signal to the regulator R and the motor M, for example, is thereby arrested. The distance s traveled by the driven element A in this time interval is then given by the equation:

$$s \sim U_{amax} \cdot T_o \qquad (4)$$

From this equation (4) it may be perceived at the outset that there are two possibilities for varying the distance s traveled by the driven element A continuously within wide limits:

If the threshold $U_{amax}$ of the trigger circuit T is varied, the travel $s$ of the element A driven by the motor M is then varied proportionately thereto. Instead, by varying the time constant $T_o$ of the integrator I (with a fixed threshold value $U_{amax}$ of the trigger circuit T) the travel s can also be varied proportionately. Of course, there is also the possibility of varying both parameters (particularly in different ranges), in order to attain in this manner a very wide range of variations for $s$.

If a constant reference voltage $U_e$ (and thus a constant speed $v$ of the driven element A) is provided, then the travel $s$ is proportional to the product of $v \times T_o$:

$$s \sim v \cdot T_o \qquad (5)$$

Accordingly, if upon adjustment of the speed $v$, the time constant $T_o$ of the integrator is varied inversely to the speed then the travel $s$ remains constant in spite of the changed speed, as in the embodiment shown in FIG. 4.

The electrical integrator in the simplest case is an RC circuit; it will be understood that many other integrating circuits may also be employed.

The surface measuring apparatus according to the invention makes possible by electrical means a continuous variation of the speed and the travel of the driven elements in a very wide range (up to 1,000:1). Mechanical means for varying the speed of travel and mechanical control contacts for varying the distance of travel can be substantially or completely eliminated, which makes possible a construction that is greatly reduced in volume.

We claim:

1. A surface measuring apparatus wherein a sensing element and a surface to be measured are moved relative to one another at a controllable speed and throughout a controllable distance, comprising at least one electrical driving motor for performing such movement, wherein the improvement comprises a source of reference voltage, a regulator to which the reference voltage is applied, for maintaining the speed of rotation of the driving motor proportional to the reference voltage, an integrator to which the reference voltage is also applied as a measure of the speed of rotation of the driving motor, and which produces an electrical output proportional to the time integral of such speed, a trigger circuit connected to the output of the integrator, and apparatus which is actuated by the trigger circuit to stop the driving motor when the output of the integrator reaches the threshold value of the trigger circuit, at least one of (a) such threshold value and (b) the time constant of the integrator being adjustable to control the distance of relative movement of the sensing element and the surface.

2. A surface measuring apparatus according to claim 1 wherein the integrator comprises a variable capacitor whose charge forms the output of the integrator, and a source of constant current for charging the capacitor, and wherein apparatus is provided for varying the reference voltage and the capacity of the capacitor inversely to one another, whereby the integrator measures the speed of rotation of the driving motor and produces an output proportional to the time integral of such speed.

3. A surface measuring apparatus according to claim 1 wherein the trigger circuit is provided with an adjustment for varying the value of the threshold voltage that actuates the trigger circuit to stop the driving motor.

* * * * *